(12) United States Patent
Nottingham et al.

(10) Patent No.: US 7,574,979 B2
(45) Date of Patent: *Aug. 18, 2009

(54) RECEIVER COLLAR (75) Inventors: John W. Nottingham, Bratenahl, OH (US); Nick E. Stanca, Westlake, OH (US); Craig Saunders, Rocky River, OH (US); Duane Gerig, Fort Wayne, IN (US)

(73) Assignee: Radio Systems Corporation, Knoxville, TN (US)

( * ) Notice: Subject to any disclaimer, the term of this patent is extended or adjusted under 35 U.S.C. 154(b) by 402 days.

This patent is subject to a terminal disclaimer.

(21) Appl. No.: 11/369,507

(22) Filed: Mar. 7, 2006

(65) Prior Publication Data

US 2006/0191491 A1 Aug. 31, 2006

Related U.S. Application Data (63) Continuation-in-part of application No. 29/224,161, filed on Feb. 25, 2005, now Pat. No. Des. 521,410, and a continuation-in-part of application No. 11/065,963, filed on Feb. 25, 2005.

(51) Int. Cl.
*A62B 35/00* (2006.01)
(52) U.S. Cl. .................... 119/863; 119/859
(58) Field of Classification Search ......... 119/769–772, 119/774, 792, 793, 795, 797, 856, 863, 865, 119/859, 718, 719
See application file for complete search history.

(56) References Cited

U.S. PATENT DOCUMENTS

| | | | | |
|---|---|---|---|---|
| 3,748,700 A * | 7/1973 | Willey | ............ | 24/172 |
| 4,887,549 A | 12/1989 | Powell | ............ | 119/29 |
| 5,207,178 A | 5/1993 | McDade et al. | ............ | 119/29 |
| 5,353,744 A | 10/1994 | Custer | ............ | 119/719 |
| 5,601,054 A | 2/1997 | So | ............ | 119/718 |
| 5,659,931 A * | 8/1997 | Anscher | ............ | 24/614 |
| 5,732,415 A * | 3/1998 | Boyd | ............ | 2/426 |
| D410,206 S | 5/1999 | Slater | ............ | D10/104 |
| 6,108,821 A * | 8/2000 | Malsoute | ............ | 2/321 |
| D439,708 S | 3/2001 | Jenkins | ............ | D30/152 |
| 6,226,844 B1 * | 5/2001 | Lerra et al. | ............ | 24/625 |
| D469,029 S | 1/2003 | So | ............ | D10/104 |
| D473,481 S | 4/2003 | So | ............ | D10/104 |
| D478,830 S | 8/2003 | So | ............ | D10/104 |
| D478,831 S | 8/2003 | So | ............ | D10/104 |
| 7,228,821 B2 * | 6/2007 | Okai | ............ | 119/863 |
| 2005/0229867 A1 | 10/2005 | Green | ............ | 119/770 |
| 2006/0169222 A1 | 8/2006 | Gerig | ............ | 119/859 |
| 2007/0119031 A1 * | 5/2007 | Beltramello | ............ | 24/170 |

FOREIGN PATENT DOCUMENTS

EP 1 206 916 11/2000

* cited by examiner

*Primary Examiner*—Kimberly S Smith
(74) *Attorney, Agent, or Firm*—Pitts & Brittian, P.C.

(57) ABSTRACT

An animal collar assembly including a wireless receiver, at least one strap and a connection assembly. The at least one strap includes a first end and a second end, and is connected to the wireless receiver. The connection assembly includes an adjustable constraint and a quick release device. The adjustable constraint is adjustably connected between the first end and the second end of the at least one strap. The quick release device is attached proximate to the second end. The quick release device being releasably connectable to the adjustable constraint.

20 Claims, 7 Drawing Sheets

RECEIVER COLLAR

CROSS REFERENCE TO RELATED APPLICATIONS

This is a continuation-in-part of U.S. patent application Ser. No. 29/224,161, entitled "A BUCKLE ASSEMBLY FOR A COLLAR MOUNTED ANIMAL RECEIVER COLLAR", filed Feb. 25, 2005 now U.S. Pat. No. d,521,410; and U.S. patent application Ser. No. 11/065,963, entitled "RECEIVER COLLAR", filed Feb. 25, 2005.

BACKGROUND OF THE INVENTION

1. Field of the Invention

The present invention relates to an animal collar assembly, and, more particularly, to an animal collar assembly including a radio frequency receiver for the modification of animal behavior.

2. Description of the Related Art

Stimulation devices are used for the modification of the behavior of an animal. The stimulation device is often associated with a collar worn by the animal and is provided to improve the behavior of the animal. Some stimulation devices include twin electrodes that are positioned against the skin of an animal, which delivers an electrical stimulus to modify the behavior of the animal. The stimulus can also be in the form of a vibration, an audible noise or other sensory stimulation to gain the attention of the animal.

A problem with known animal modification collars is that they allow the stimulation portion to be in a position in which it is not adequately coupled to the skin of the animal. When the stimulation portion of the collar is not adequately coupled, this leads to a lowered stimulation of the animal, which leads to ineffective training. To compensate for inadequate coupling to the skin the collar is often tightened, which can lead to discomfort to the animal. Another manner in which inadequate coupling to the skin is compensated for is to intensify the level of the stimulation, which can lead to over stimulation. These modifications of the stimulus device to overcome difficulties with coupling of the stimulation device to the animal can lead to less than optimal feedback to the animal.

It is well known to utilize a buckle on a collar, such as a belt buckle that is adjustable by selectively placing a pin attached to the buckle through a hole in the strap. The selection of the hole in the strap effectively adjusts the length of the belt around an object, such as the neck of an animal. The pin of the buckle is rotationally constrained by a transverse spar thereby preventing the variation in length of the belt once a hole is selected. The problem with conventional adjustable belts is that the selection of the hole in the strap is necessary each time the collar or belt is put in place about the neck of an animal.

What is needed in the art is a collar assembly, which provides adjustable yet quick coupling of the collar stimulation device to the animal.

SUMMARY OF THE INVENTION

The present invention is related to an animal collar assembly having an adjustable strap that is quickly and easily connected and released without the need to adjust the selection of an adjustment of the collar.

The invention comprises, in one form thereof, an animal collar assembly including a wireless receiver, at least one strap and a connection assembly. The at least one strap includes a first end and a second end, and is connected to the wireless receiver. The connection assembly includes an adjustable constraint and a quick release device. The adjustable constraint is adjustably connected between the first end and the second end of the at least one strap. The quick release device is attached proximate to the second end. The quick release device being releasably connectable to the adjustable constraint.

An advantage of the present invention is that the collar can be replaced on an animal without adjustment to its original position.

Another advantage of the collar of the present invention is that it can be pre-adjusted to a desirable loop diameter prior to be positioning on the neck of an animal.

Yet another advantage of the present invention is that the collar can be quickly released by way of the quick release device.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
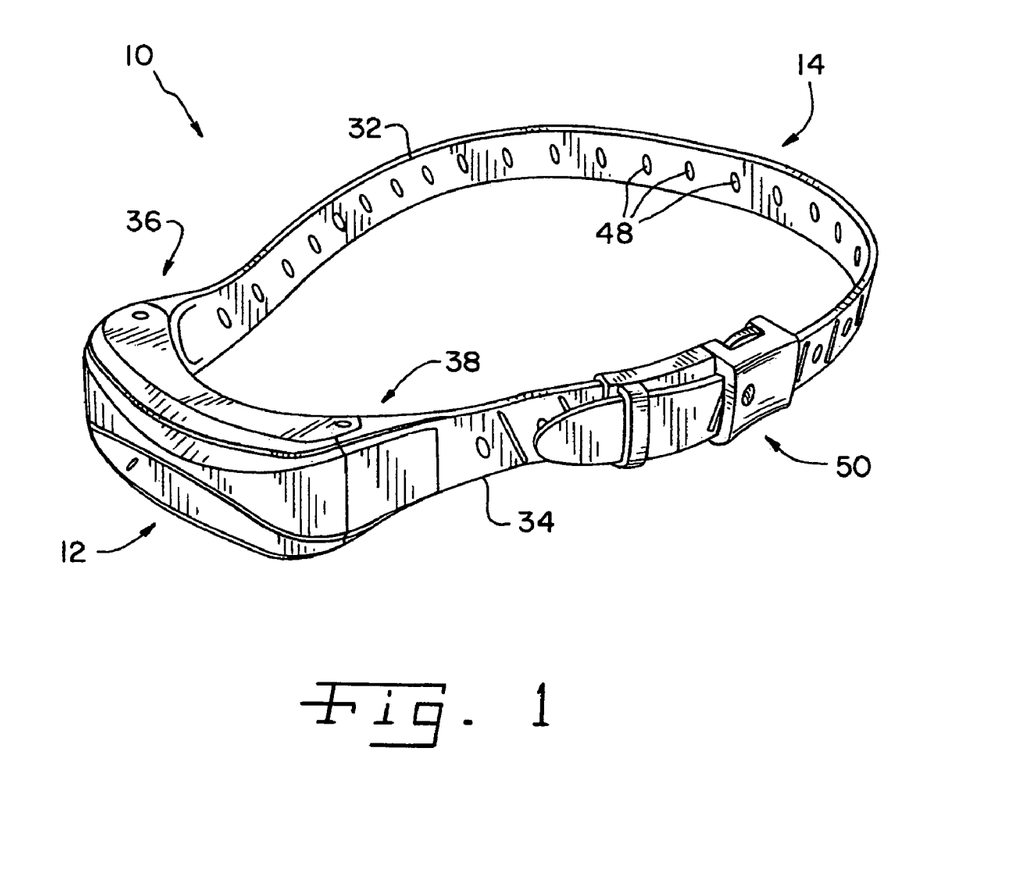
FIG. 1 is a perspective view of an embodiment of an animal collar assembly of the present invention.
Figure 2:
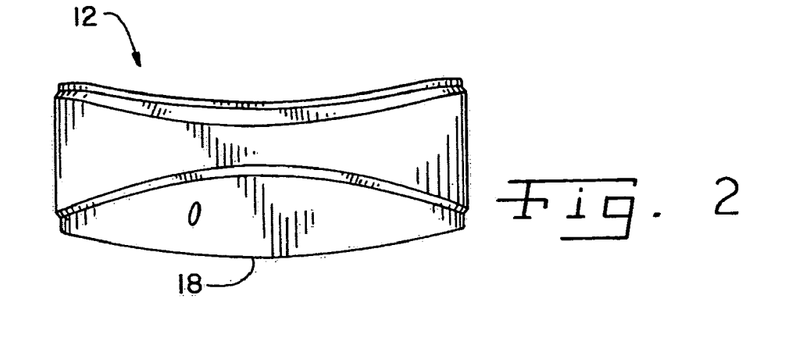
FIG. 2 is a front view of the housing of the collar assembly of FIG. 1.
Figure 3:
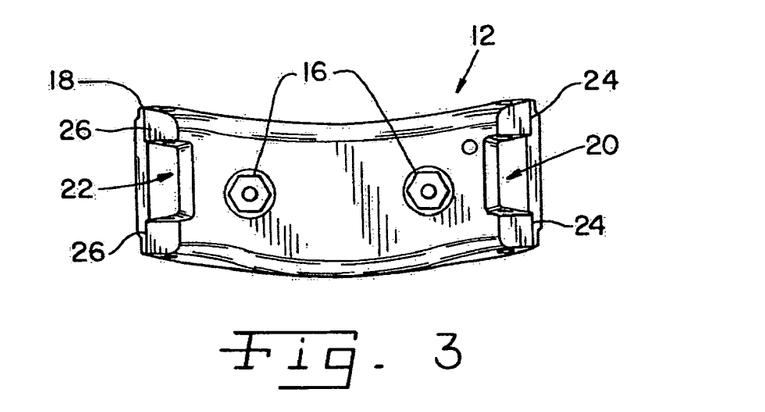
FIG. 3 is a rear view of the housing of FIGS. 1 and 2.
Figure 4:
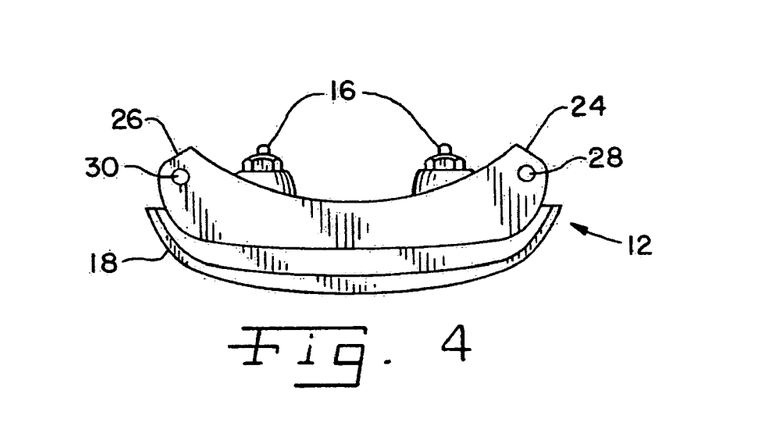
FIG. 4 is a top view of the housing of FIGS. 1-3.
Figure 5:
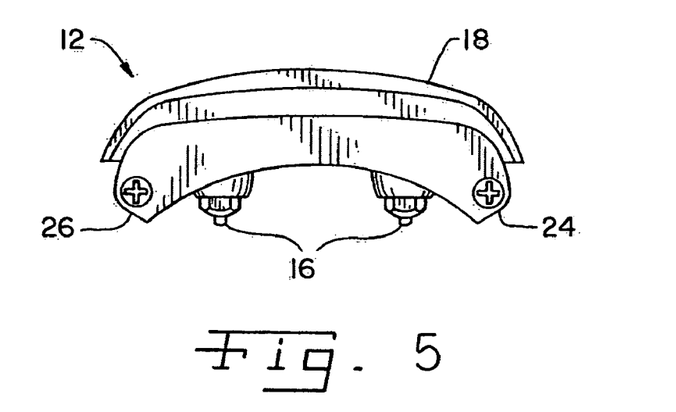
FIG. 5 is a bottom view of the housing of FIGS. 1-4.
Figure 6:
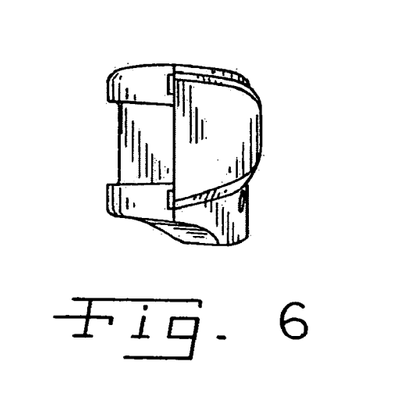
FIG. 6 is an end view of the housing of FIGS. 1-5.
Figure 7:
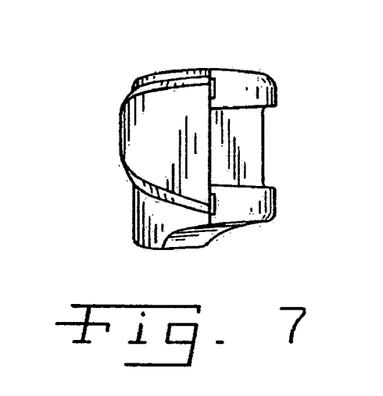
FIG. 7 is another end view of the housing of FIGS. 1-6.

Referring now to the drawings, and more particularly to FIG. 1, there is shown an embodiment of an animal collar assembly 10, including a receiver assembly 12, collar straps 14 and a connection assembly 50.

Now, additionally referring to FIGS. 2-8, receiver assembly 12 includes electrodes 16 attached to an arcuate housing 18. Electrodes 16 are electrically interconnected with a receiver assembly contained within housing 18 and they provide a stimulation to the animal, which is often a dog. Electrodes 16 are electrical conductors 16 that extend from a side wall of receiver assembly 12. The receiver contained within housing 18 receives radio frequency or other types of signals, in a wireless manner, processes them using predefined criteria and, when directed, applies a stimulation by way of electrodes 16 to the dog. Even though the stimulation is referred to as an electrical stimulation by way of electrode 16, it is understood that the stimulation may be of any variety in which sensory perception by the dog is stimulated to thereby modify the behavior of the dog. Advantageously, housing 18 has an arcuate formed shape approximating the curvature of the neck of the dog.

Housing 18 includes a pair of attachment features 20 and 22 in the form of a first shaped cavity 20 and a second shaped cavity 22. Housing 18 additionally includes a first set of protrusions 24 and a second set of protrusions 26. Cavities 20 and 22 are substantial mirror images of each other and provide for the interconnection between straps 14 and housing 18. Cavities 20 and 22 are generally concave in shape. Protrusions 24 and protrusions 26 are substantial mirror images of each other. Protrusions 24 and 26 extend beyond cavities 20 and 22 and have holes 28 and 30, respectively, therethrough. Holes 28 and holes 30 allow for the insertion of a pin, screw or other fastener through protrusions 24 and 26 and through accommodating holes in straps 14 for the connection of assembly 12 and straps 14.

Figure 8:
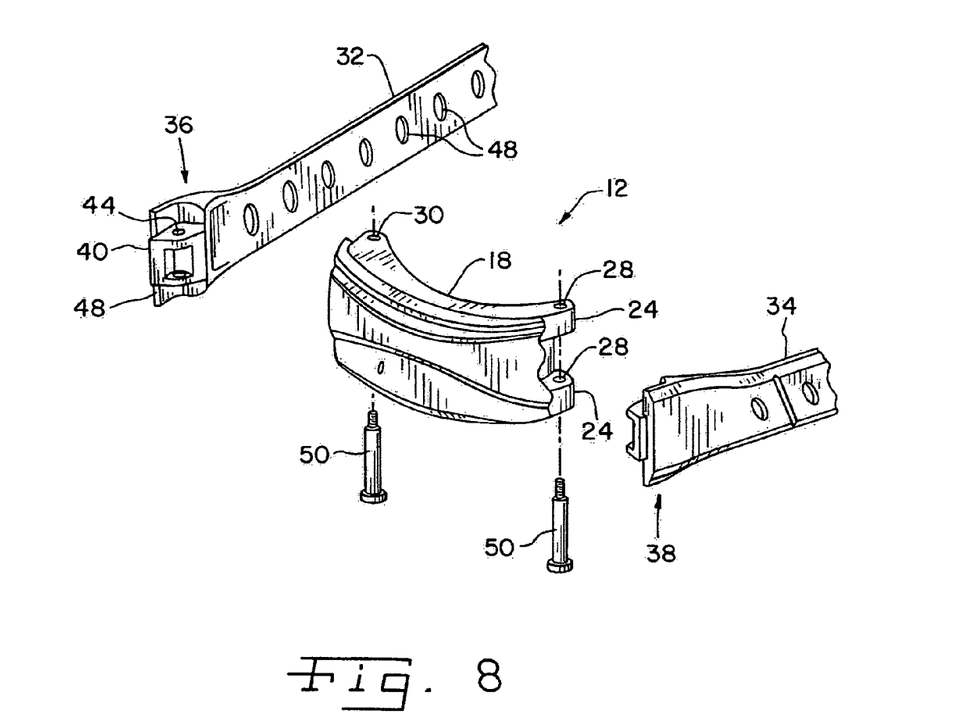
FIG. 8 is an exploded perspective view of the collar assembly of FIG. 1.
Figure 9:
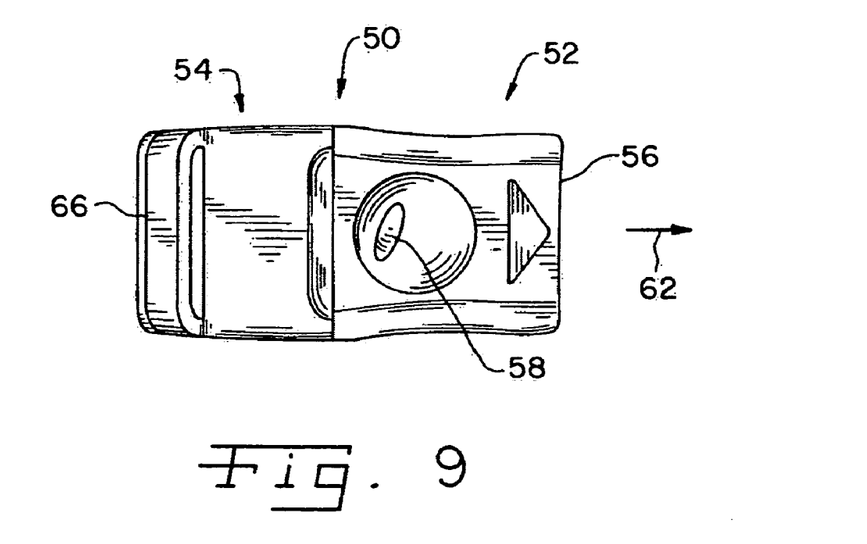
FIG. 9 is a view of an embodiment of the connection assembly of the collar of FIG. 1.
Figure 10:
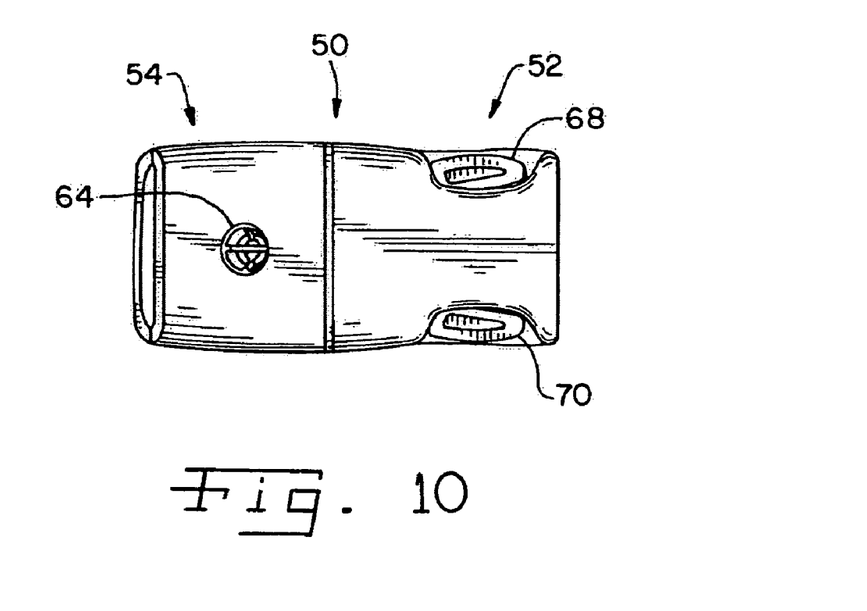
FIG. 10 is another view of the connection assembly of FIGS. 1 and 9.
Figure 11:
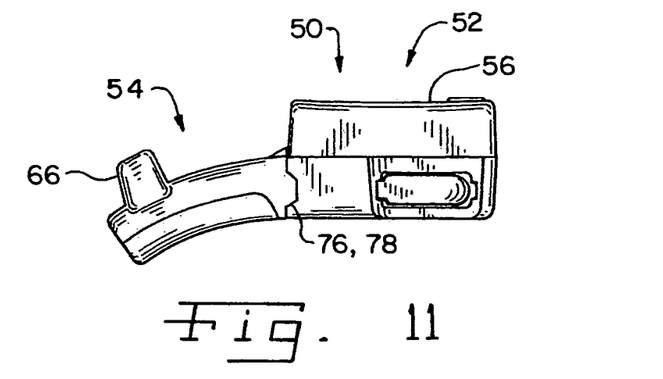
FIG. 11 is a side view of the connection assembly of FIGS. 1, 9 and 10.
Figure 12:
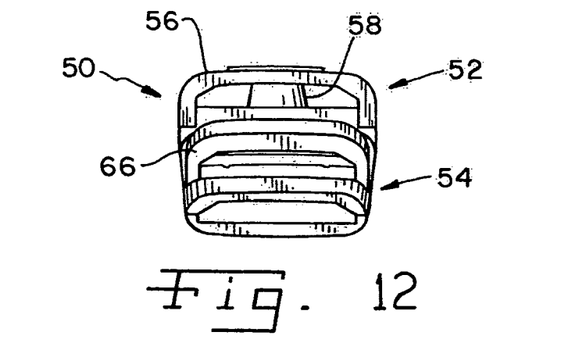
FIG. 12 is an end view of the connection assembly of FIGS. 1 and 9-11.
Figure 13:
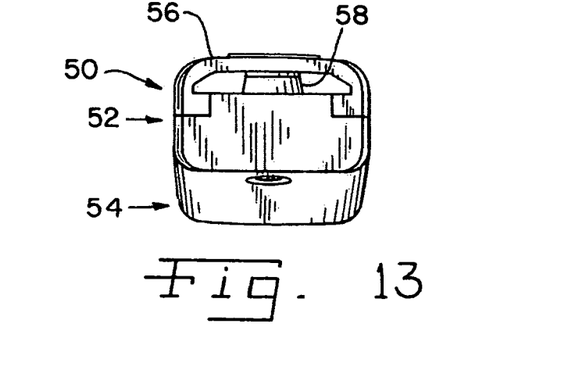
FIG. 13 is another end view of the connection assembly of FIGS. 1 and 9-12.
Figure 14:
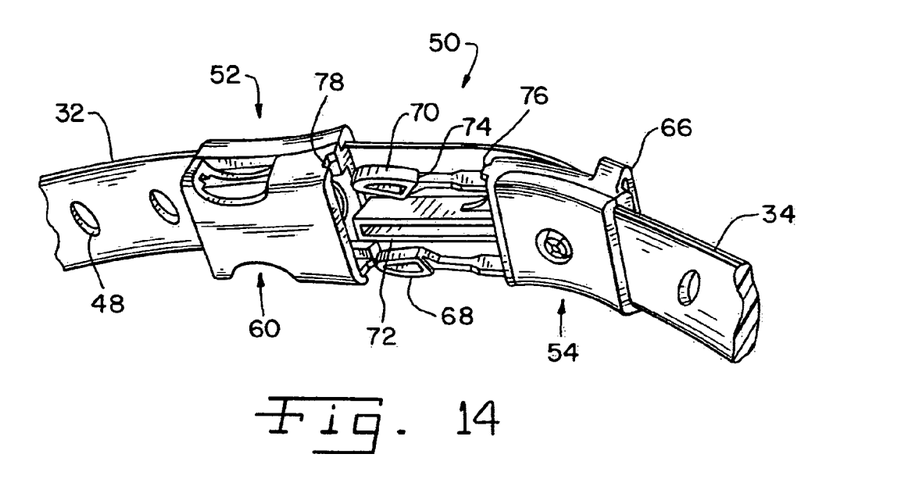
FIG. 14 is a perspective view of the connection assembly of FIGS. 1 and 9-13.
Figure 15:
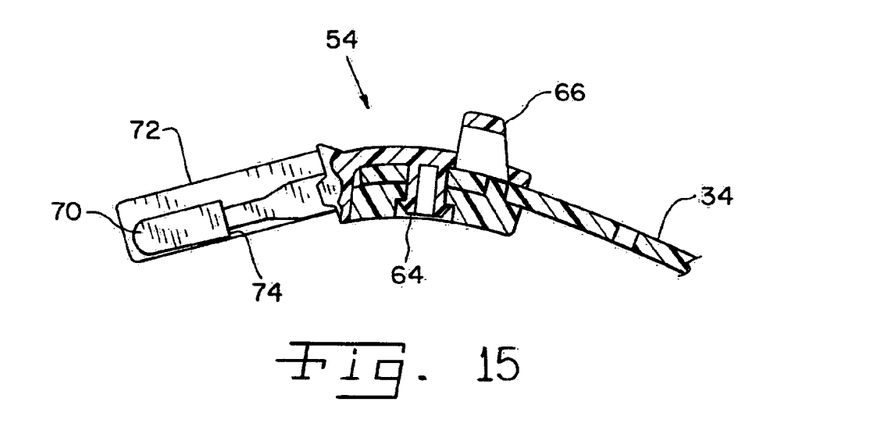
FIG. 15 is a partially cross-sectional side view of a portion of the connection assembly of FIGS. 1 and 9-14.

Straps 14, which may be a single strap that forms a collar 14, are illustrated as two straps 14 that include a first strap 32 and a second strap 34. Strap 32 has a mating end 36 and strap 34 has a mating end 38. Mating ends 36 and 38 are provided with attachment features which accommodate attachment features 20 and 22 of housing 18 to constrain the rotational movement of straps 14 relative to receiver housing 18. Mating end 36 includes an attachment feature 40 also known as a lug 40 having a hole 44 therethrough and an end surface 48. Lug 40 extends from along a side of strap 32 in a convex manner and substantially fills cavity 20 when assembled into receiver collar assembly 10. Lug 40 may have a hollow concave portion therein. Constraining device 50 is inserted through holes 30 and 44 to coaxially align holes 44 and 30, thereby attaching strap 32 to housing 18. The combination of end face 48 and lug 40 are mated with cavity 20 to constrain the rotational movement of strap 32 relative to housing 18. This substantially provides a continuation of the arcuate shape of housing 18 and imparts an initial angular direction to strap 32. Strap 34 has an attachment feature like that of strap 32 and is connected by way of holes 28 in a substantially similar manner as strap 32 is connected to housing 18.

Advantageously, straps 14 have an initial angular relationship with housing 18, which holds receiver assembly 12, so that it more readily couples with the neck of a dog. Even though straps 14 are flexible, the rotational movement of receiver assembly 12 is constrained by the present invention. The relative limited rotational movement between straps 14 and housing 18 contributes to maintaining the generally circular shape of collar assembly 10. The angular relationship is fixedly maintained by the attachment features of collar 14 and housing 18. As a result electrodes 16 are maintained at a fixed angular relationship to the attachment features of collar 14. The angular relationship is an acute angle of between 30° and 80° and preferably between 45° and 75°.

Alternatively, the present invention may allow straps 14 to rotate inwardly from the positioned depicted in FIG. 1, but be constrained from rotating outwardly by way of end surface 48 and its being abutted against a portion of housing 18.

Receiver collar assembly 10 can be assembled by aligning lug 40 and inserting it into a cavity 20 or 22 and then inserting constraining device 50, in the form of a pin or other constrained fastener, through holes 30 and 44 to couple strap 32 to housing 18. In a similar manner, strap 34 may be connected to the remaining cavity with the insertion of another device 50.

While cavities 20 and 22 have been depicted in housing 18, housing 18 could have a protrusion and straps 14 have a recess or cavity, thereby reversing the attributes of the housing and the strap, yet accomplishing the same feature as depicted in the figures.

Now, additionally referring to FIGS. 9-15 there is shown additional details of connection assembly 50. Connection assembly 50 includes an adjustable constraint 52, and a quick release device 54. Strap 32 has a multitude of holes 48 that are in the form of a shaped hole 48 that is adjustably connected to adjustable constraint 52 between the ends of strap 32. While adjustable constraint 52 is illustrated in one particular form, any adjustable constraint, even that of a common buckle found on a dog collar can be utilized.

Quick release device 54 interacts with a portion of adjustable constraint 52 to provide a quick release of strap 34 from strap 32. Quick release device 54 snaps into place in adjustable constraint 52 and is easily releasable therefrom.

In the embodiment of adjustable constraint 52, as illustrated in the drawings, there is included a releasable top 56, a protrusion 58 and recessed openings 60. Protrusion 58 may be a shaped pin 58, having a shape that corresponds with the shape of a hole 48. Releasable top 56 is slidable in direction 62. Once releasable top 56 is removed, a hole 48 of strap 32 is selected and positioned over shaped pin 58 to adjustably constrain strap 32 at a predetermined length. Releasable top 56 is then slid back in place in a direction opposite to direction 62, thereby constraining strap 32 to a fixed length relative to connection assembly 50. Shaped pin 58 is depressible and extends into a portion of releasable top 56. A feature of quick release device 54 interacts with shaped pin 58 to prevent it from being depressed when quick release device 54 is connected with adjustable constraint 52.

Quick release device 54 includes a fastener 64, a strap constraint 66, a captivating arm 68, a captivating arm 70 and a locking bar 72. Fastener 64 connects an end of strap 34 to quick release device 54. Fastener 24 may be removably connected with strap 34 or may be permanently fastened thereto. Strap constraint 66 allows a portion of strap 32 to extend therethrough to reduce movement of the end of strap 32.

Captivating arms 68 and 70 are biased outwardly opposite to each other so that when they are inserted into a portion of adjustable constraint 52 they are forced toward each other until arriving at recessed openings 60 at which time a latching edge 74 of captivating arms 68 and 70 engage with a feature of adjustable constraint 52 thereby latching quick release device 54 to adjustable constraint 52. Locking bar 72 co-acts with an underneath side of strap 32 and shaped pin 58 to prevent the release of releasable top 56 when locking bar 72 is inserted into adjustable constraint 52. To release quick release device 54 from adjustable constraint 52, captivating arms 68 and 70 are pressed inwardly toward each other thereby allowing quick release device 54 to be slid from adjustable constraint 52. Advantageously, adjustable constraint 52 does not have to be altered or a hole 48 selected each time collar 14 is replaced onto the neck of an animal. Additionally a protrusion 76, associated with quick release device 54, serves to key quick release device 54, by its interaction with receiving recess 78 of adjustable constraint 52, to adjustable constraint 52.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An animal collar assembly, comprising:
 a wireless receiver;
 at least one strap including a first end and a second end, said at least one strap being connected to said wireless receiver; and
 a connection assembly including:
  an adjustable constraint adapted to be removably fixed to said at least one strap at a plurality of locations along said at least one strap, the plurality of locations being between said first end and said second end, sad adjustable constraint being immovable along the length of said at least one strap when it is fixed to said at least one strap at any of the plurality of locations; and
  a quick release device attached proximate to said second end, said quick release device being releasably connectable to said adjustable constraint.

2. The assembly of claim 1, wherein said adjustable constraint includes at least one of a buckle and a protrusion.

3. The assembly of claim 2, wherein said quick release device includes at least one captivating arm.

4. The assembly of claim 3, wherein said at least one captivating arm is a plurality of captivating arms.

5. The assembly of claim 4, wherein said plurality of captivating arms include a first captivating arm and a second captivating arm, said first captivating arm being biased in a direction opposite to said second captivating arm.

6. The assembly of claim 5, wherein said quick release device is captivated to said adjustable constraint by sliding said quick release device at least partially into said adjustable constraint.

7. The assembly of claim 5, wherein said quick release device is released from said adjustable constraint by depressing said plurality of captivating arms and sliding said quick release device from said adjustable constraint.

8. The assembly of claim 1, wherein said adjustable constraint is adjustable along said at least one strap thereby altering a neck size of the collar.

9. The assembly of claim 1, wherein said adjustable constraint includes a keying feature and quick release device includes a complimentary keying feature, the keying features of said adjustable constraint and quick release device co-acting to align said adjustable constraint in said quick release device to each other prior to connection.

10. An animal collar, comprising:
 at least one strap including a first end and a second end, said at least one strap being connectable to a wireless receiver; and
 a connection assembly including:
  an adjustable constraint adapted to be removably fixed to said at least one strap at a plurality of locations along sad at least one strap, the plurality of locations being between said first end and said second end, said adjustable constraint being immovable along the length of said at least one strap when it is fixed to said at least one strap at any of the plurality of locations; and
  a quick release device attached proximate to said second end, said quick release device being releasably connectable to said adjustable constraint.

11. The collar of claim 10, wherein said adjustable constraint includes at least one of a buckle and a protrusion.

12. The collar of claim 11, wherein said quick release device includes said at least one captivating arm.

13. The collar of claim 12, wherein said at least one captivating arm is a plurality of captivating arms.

14. The collar of claim 13, wherein said plurality of captivating arms include a first captivating arm and a second captivating arm, said first captivating arm being biased in a direction opposite to said second captivating arm.

15. The collar of claim 14, wherein said quick release device is captivated to said adjustable constraint by sliding said quick release device at least partially into said adjustable constraint.

16. The collar of claim 14, wherein said quick release device is released from said adjustable constraint by depressing said plurality of captivating arms and sliding said quick release device from said adjustable constraint.

17. The collar of claim 10, wherein said adjustable constraint is adjustable along said at least one strap thereby altering a neck size of the collar.

18. A method of adjusting a behavior modification collar, comprising the steps of
 depressing at least one tab on a quick release device thereby releasing said quick release device from an adjustable constraint of a connection assembly;
 altering the connection point of said adjustable constraint along a length of a strap of the collar, the connection point being one of a plurality of connection points along the length of the strap, said adjustable constraint being immovable along the length of the strap of the collar when connected at any of the plurality of connection points; and
 sliding said quick release device at least partially into said adjustable constraint to connect said quick release device to said adjustable constraint.

19. The method of claim 18, wherein said at least one tab includes a first tab and a second tab, said first tab being a portion of a first captivating arm, said second tab being a portion of a second captivating arm.

20. The method of claim 19, wherein said first captivating arm and said second captivating arm are biased in opposite directions from each other.

* * * * *